United States Patent
Terrell, II et al.

[11] Patent Number: 6,026,027
[45] Date of Patent: Feb. 15, 2000

[54] FLASH MEMORY SYSTEM HAVING MEMORY CACHE

[75] Inventors: James Richard Terrell, II, Marion, Iowa; Paul Beard, Milpitas, Calif.

[73] Assignee: Norand Corporation, Cedar Rapids, Iowa

[21] Appl. No.: 08/428,856

[22] Filed: Apr. 25, 1995

Related U.S. Application Data

[63] Continuation-in-part of application No. 08/372,201, Jan. 12, 1995, which is a continuation-in-part of application No. 08/302,128, Sep. 7, 1994, which is a continuation-in-part of application No. 08/240,039, May 9, 1994, abandoned, which is a continuation-in-part of application No. 08/189,696, Jan. 31, 1994, abandoned.

[51] Int. Cl.[7] ................................................ G11C 13/00
[52] U.S. Cl. .......................... 365/185.33; 365/73; 365/63
[58] Field of Search .................................. 365/185.33, 63, 365/73, 103, 104, 185.09, 189.12

[56] References Cited

U.S. PATENT DOCUMENTS

| | | | |
|---|---|---|---|
| 4,947,373 | 8/1990 | Yamaguchi et al. | 365/189.04 |
| 5,608,673 | 3/1997 | Rhee | 365/185.33 |

FOREIGN PATENT DOCUMENTS

WO 94/27382  11/1994  WIPO .

OTHER PUBLICATIONS

Boxer, "Where Buses Cannot Go" *IEEE pectrum*, pp. 41–45 (Feb. 1995).

*Primary Examiner*—Terrell W. Fears
*Attorney, Agent, or Firm*—Suiter & Associates PC

[57] ABSTRACT

The present invention discloses an electronic memory system having semipermanent memory storage, a memory device for rapid data transfer and temporary memory storage, and controller for monitoring and controlling writes to the semipermanent memory storage.

24 Claims, 2 Drawing Sheets

FLASH MEMORY SYSTEM HAVING MEMORY CACHE

CROSS-REFERENCE TO RELATED APPLICATIONS

The present application is a continuation-in-part of U.S. application Ser. No. 08/372,201 (Attorney Docket No. 38053Y) filed Jan. 12, 1995, which is a continuation-in-part of U.S. application Ser. No. 08/302,128 (Attorney Docket No. 38053B) filed Sep. 7, 1994, which is a continuation-in-part of U.S. application Ser. No. 08/240,039 (Attorney Docket No. 38053A) filed May 9, 1994, now abandoned, which in turn is a continuation-in-part of U.S. application Ser. No. 08/189,696 (Attorney Docket No. 38053) filed Jan. 31, 1994, now abandoned.

The present invention may be utilized as memory storage means in various local area network devices such as a radio unit capable of participation on multiple local area networks as described in PCT WO 94/27382. The present invention may also be utilized as memory storage means in various local area network devices such as a data collection terminal having an integrated multiple input and output system as described in U.S. application Ser. No. 08/393,409 (Attorney Docket No. 38075B) filed Feb. 17, 1995 by Alan Bunte et al.

All of the aforementioned applications are incorporated herein by reference.

TECHNICAL FIELD

The invention relates generally to flash memory storage devices in digital computer systems, and more particularly to an implementation of flash memory wherein the effective speed of the flash operational cycles is increased and wear on the flash memory is evenly distributed.

BACKGROUND ART

The most recent advances in semiconductor memory storage devices have occurred in flash memory. Flash memory is nonvolatile and therefore memory states are retained without the need for supplying power to the flash memory. Flash memory devices are rapidly replacing read only memory (ROM) chips in desktop applications, and because they will retain memory states without power, flash memory devices are becoming the alternative to electrically erasable and programmable read only memories (EEPROM). The nonvolatility characteristic makes flash memory devices ideal for applications in which low power consumption is an important design criterion, such as in portable computer and data terminal systems where flash memory is replacing hard disk drives as the main random access semipermanent memory storage device.

A current problem encountered in digital microprocessor applications is that the bandwidth (operating speed) of the microprocessors far exceeds the bandwidth of the random access memory devices. This bandwidth mismatch often places the microprocessor into an unproductive wait state wherein the microprocessor spends extra cycles waiting for the operation to be performed by the memory to be completed. Static random access memory (SRAM) devices have higher bandwidths than do dynamic random access memory (DRAM) devices but SRAMs are more costly and have lower memory densities than do DRAMs. It is for these reasons that DRAMs are preferred over SRAMs where cost and space are at a premium.

In order to improve the bandwidth of DRAM memory systems and thereby reduce the bandwidth gap between the microprocessor and the main random access memory, many designs employ SRAM devices and DRAM devices together in a circuit arrangement known as a cache hierarchy in order to maximize the respective advantages of both memory technologies. In cache hierarchy architecture, a small SRAM memory device is placed between the microprocessor and a large bank of DRAM memory devices. The SRAM acts as a memory buffer between the microprocessor containing information most frequently requested by the microprocessor that the SRAM can transfer to and from the microprocessor at a faster rate than the DRAM could do directly. Multiple variations of this cache hierarchy exist with different implementations designed to improve access time to the random access memory.

In applications where an entirely solid state memory device is desired as the main random access memory to be used in place of electromechanical memory storage devices, DRAM devices are used to implement a virtual RAM disk. However, DRAM memory is volatile and requires external power in order to preserve the saved memory states. The nonvolatility of flash memory makes it an ideal replacement to DRAM memory devices because no external power is required to maintain the memory contents of flash memory. Flash memory read access times are of the same order of magnitude as DRAM read access times, however flash write and erase speeds are much slower. Therefore cache hierarchy architecture with flash memory implementations is required even more so with flash memory than with DRAM memory.

The basic memory element in flash memory designs is a complementary metal oxide semiconductor (CMOS) transistor which is a subclass of field-effect transistors (FETs). The gate voltage on the flash transistor memory cell floats with respect to ground, that is the gate voltage is electrically isolated from the rest of the transistor circuit. To save a memory state to the flash memory cell (i.e. perform a write to the memory cell), the gate of the CMOS transistor is connected to the supply voltage, the source of the transistor is grounded, and the drain of the transistor is biased to an intermediate voltage, typically one half of the supply voltage. In this configuration, the drain of the CMOS transistor is at a higher voltage than the source of the transistor, and negatively charged electrons flow from the source to the drain. Since the gate is also at a positive voltage with respect to the source, some of the electrons flowing from the source to the drain will reach a high enough energy state to tunnel through the oxide layer barrier. These so called "hot" electrons remain on the floating gate, and therefore the threshold voltage required to turn on the transistor is increased.

In order to change the saved memory state (i.e. perform an erase of the memory cell), the reverse of the aforementioned write procedure is performed. To perform an erase the gate of the CMOS transistor is negatively biased with respect to the source of the transistor; typically the source is connected to the supply voltage and the gate is grounded. Thus the electrons that accumulated on the floating gate in the write process tunnel back again through the oxide layer in a process known as Fowler-Nordheim tunneling. This flash memory write and erase process is similar to that used in erasable programmable read only memory (EPROM) design, however the main difference between the two is that the oxide layer in the flash design is thinner than in the EPROM design in order to allow for the flash erase process to be accomplished electrically whereas the EPROM erase process requires exposure of the device to ultraviolet (UV) radiation in order to give the accumulated electrons enough energy to tunnel (Fowler-Nordheim tunneling) back through the EPROM's thicker oxide layer.

Because the flash memory cell CMOS transistor has a relatively thin oxide layer in order to allow for electrical memory erases, the tunneling process will eventually wear out the oxide layer of the flash CMOS transistor. Thus the lifetime of the flash memory device is limited to a certain number of write and erase cycles which typically range from 10,000 to 1,000,000 cycles. Additionally, the wear encountered on the oxide layer of the flash memory cell CMOS transistors is not evenly distributed across the entire flash memory array. If the flash memory device is used in random access applications such as a solid-state implementation of a hard disk drive, some of the flash memory cells will undergo more write and erase cycles than other cells causing some cells to wear out more rapidly than other cells, thereby wearing out the flash memory device and ending its useful life sooner than if the write and erase cycles had been more evenly distributed among all of the transistors in the flash memory array.

Flash memory chip manufacturers are designing flash memory devices that make the slow write and erase cycles less noticeable and that additionally distribute wear more evenly across the entire memory device. In addition there exist software and hardware implementations of flash memory which intelligently manage flash memory device wear by periodically rearranging memory blocks so that information stored in relatively inactive memory blocks is relocated to relatively active memory blocks thereby freeing the inactive blocks so they may be written upon. The number of times a block of memory has been erased is also monitored by this type of system software in order to identify which memory blocks are likely to be close to wearing out. However no method exists that determines the exact number of writes that are available to the flash memory.

OBJECTS OF THE INVENTION

The objective of the present invention is to utilize flash memory in such a way as to have the speed of the write cycles be of the same order as the operational speed of the system microprocessor in a given application so as to enhance overall write time performance. Because of the wear associated with the breakdown in the oxide layer of the flash CMOS transistors, it is additionally desired to address the problem of the limited number of write cycles able to be performed upon a flash memory device by designing a flash memory system wherein the writes are performed to the flash memory in such a manner as to evenly distribute wear across the entire flash memory device. It is further desired to perform the read and write cycles to the to the flash memory system so as to function transparently to the system microprocessor.

It is therefore an object of the invention to increase the effective operational bandwidth of an implementation of flash memory.

It is therefore another object to distribute wear evenly upon the flash memory device and thereby increase its operational lifespan.

DETAILED DESCRIPTION OF THE INVENTION

Figure 1:
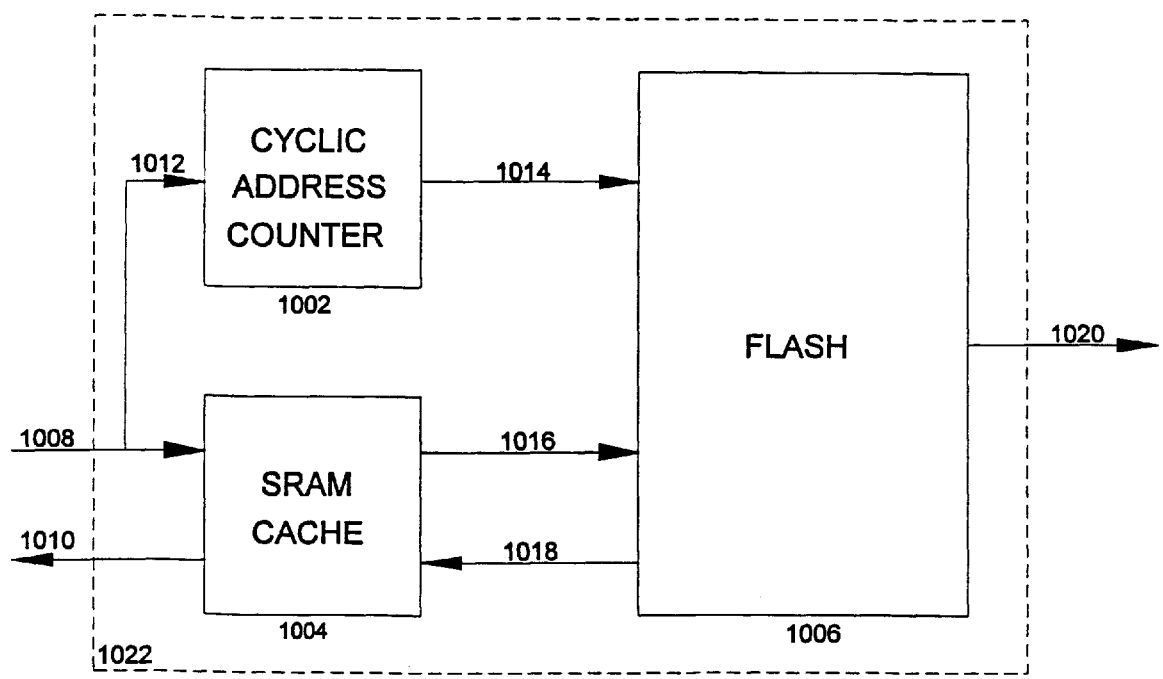
FIG. 1 is a diagram of the electronic configuration of the cache flash memory system circuit it arrangement.

FIG. 1 depicts the logical data flow arrangement of the cache flash memory system 1022. The flash memory device 1006 interfaces with the static random access memory device (SRAM) 1004. The SRAM device 1004 acts a memory buffer, or cache, between the system microprocessor (not depicted) and the flash memory. The SRAM device 1004 obtains data from the system microprocessor by obtaining a complete section of memory from the system microprocessor through the data input line 1008. Concurrently with the capture of the section of memory the cyclic address counter 1002 obtains address information from the system microprocessor through address line 1012. The cyclic address counter 1002 tracks the writes to the flash memory device 1006 and determines to what sector on the flash memory device 1006 the newly captured data currently being loaded into the SRAM device 1004 will be written. The cyclic address counter translates linear addresses transparently to the interface with the system microprocessor and controls the writes to the flash memory device 1006 in a linear fashion through address line 1014. The transparent linear address interface ensures that successive writes to the flash memory device 1006 are evenly distributed to all sections of the flash memory 1006 in order to provide even wear of the flash memory cells. Because no area of the flash memory 1006 will be written to more frequently than any other memory area, the operational lifespan of the flash memory device 1006 will be maximized.

The SRAM device 1004 executes a writeback cycle by writing a completely captured section of memory to the flash memory address through data line 1016 as determined by the cyclic address counter 1002. The SRAM device 1004 is capable of accessing the data that was written to the flash memory 1006 through data line 1018. Since the SRAM device 1004 can capture data at a higher rate from the system microprocessor than the flash memory device 1006, the effective write bandwidth of the flash memory device 1006 as viewed from the system microprocessor is increased.

Once data has been saved to the flash memory device 1006 it may be read by the system microprocessor directly through data line 1020. If the data requested by the system microprocessor is contained in the SRAM memory device 1004 the requested data may be read by the system microprocessor through data line 1010.

Figure 2:
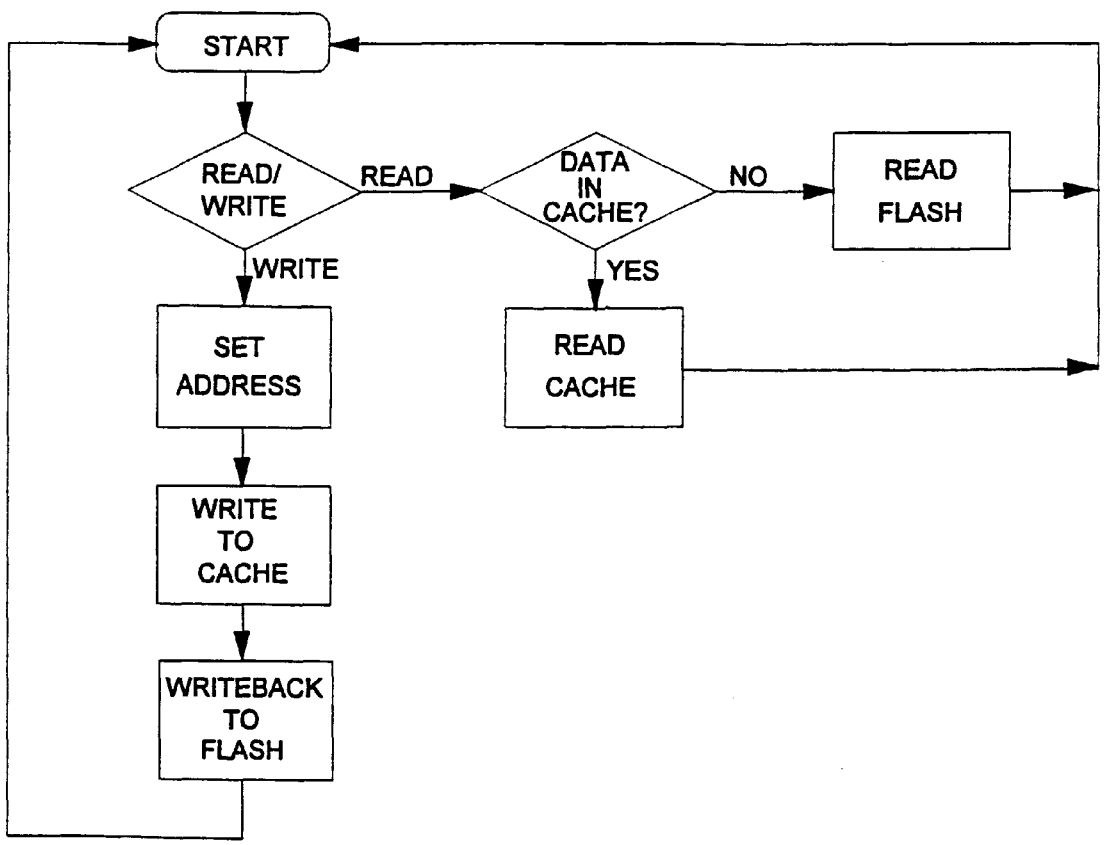
FIG. 2 is a control logic flow diagram sequence to be followed for reading from and writing to the cache flash memory system according to the invention.

FIG. 2 depicts the control logic flow diagram sequence to be followed when data is written to or read from the cache flash memory system 1022. The operation of the read and write sequences are performed within the cache memory system 1022 so that internal memory operations are transparent to the external system microprocessor.

When data is to be written to the cache flash memory system 1022 by the system microprocessor, the flash memory 1006 address is set by the cyclic address counter 1002. The data is then written to and captured by the SRAM device 1004 memory cache. Upon the capture of a complete section of memory by the SRAM device 1004, the memory is written back to the flash memory device 1006 in the location set by the cyclic address counter 1002. The cache flash memory system 1022 is now ready for the next read or write cycle.

If data is to be read from the cache flash system 1022, the data may be read directly from the SRAM device 1004 if therein contained. If the data to be read is stored in the flash memory device 1006 the system microprocessor may read the saved memory directly from the flash device 1006.

Utilizing flash memory as the main semipermanent memory storage device in a data terminal in lieu of standard hard disk drives results in new drive formatting and file allocation design considerations. For example, the file allocation table (FAT) used for organizing hard disk drive memory storage with a standard MS-DOS® operating system commonly used in IBM® type personal computers in conjunction with standard hard disk drives is not optimized for use with flash disk drives. The FAT file system may constantly and repeatedly write to the same sectors of the hard disk drive. Thus the flash memory device would not experience even wear if a FAT file system of standard drive formatting were used in conjunction therewith. However, it is desirable to format the flash drive with a standard FAT file system for compatibility of being booted and utilized with MS-DOS®, WINDOWS™ and other common PC operating environments.

A common way to create a FAT formatted flash file is to create the image of the required format and save the image on either a floppy disk or in non-volatile memory, for example SRAM. The image may then be later transferred to the flash array as one large portion of memory. This standard method of FAT flash formatting is awkward and inefficient because of the number of steps and the amount of time required to accomplish the memory transfer task. Additionally, the amount of memory to be transferred is limited by the size of the intermediate storage device.

It is therefore desirable to be able to write directly to the flash memory device as if it were a hard drive using the standard drive BIOS (basic input output system). The flash memory device may be implemented using standard hard disk drive formatting. As previously discussed, direct access to the flash device would cause the device to wear out prematurely since the FAT format concentrates writing to specific memory sectors. Additionally, when data is written to part of the flash memory array the entire flash "erase block" must be erased. For example, a one sector write of 512 bytes to the flash memory device may cause an entire block of 64 KB to be erased and rewritten. If a particular application or copy utility were to copy data into flash memory one sector at a time, 128 erases will be needed for each 64 KB of data copied thereby increasing wear on the flash memory device. This process would be slow and inefficient since flash erase time are on the order of one second. Many small sized memory writes to the root directory and file allocation table sectors would occur as files are created, modified and deleted resulting in premature failure of these portions of the flash memory device.

The present invention entails directly writing to the flash memory device using the BIOS interface. The flash memory device is not physically written to on every write. Instead, the data is written to the cache of the flash memory device until an entire "erase block," for example 64 KB, has been modified or until the user or an application indicates that modification of the flash drive is complete whereupon the contents of the cache memory are physically written to the flash memory device. This approach allows for fast and easy modification of a FAT formatted flash drive without causing undue wear on the allocation table or the root directory of the flash memory device.

A preferred embodiment may utilize a standard DOS TSR (terminate-and-stay-resident) memory resident program enabling standard BIOS writes to the flash drive. The TSR may use a portion of extended memory to do the caching, or alternatively the caching may be performed with a separate high speed random access memory device such as the SRAM device 1004 of FIG. 1.

In view of the above detailed description of a preferred embodiment and modifications thereof, various other modifications will now become apparent to those skilled in the art. The claims below encompass the disclosed embodiments and all the reasonable modifications and variations without departing from the spirit and scope of the invention.

What is claimed is:

1. An electronic memory system comprising:
   (a) a first memory device for semipermanent memory storage;
   (b) a second memory device for rapid data transfer and temporary memory storage; and
   (c) a controller operatively connected with said first and second memory devices for monitoring and controlling writes to said first memory device such that successive write operations to said first memory device are made successively to all sections of first memory device.

2. The electronic memory storage system of claim 1 wherein said first memory device comprises flash memory.

3. The electronic memory storage system of claim 1 wherein said second memory device comprises control logic for writing and reading said data to and from said first memory device.

4. The electronic memory storage system of claim 1 wherein said controller comprises control logic for controlling the allocation and distribution of writes to said first memory device so that data to be written to said first memory device is saved to said second memory device until an entire block has been saved and then writing said saved entire block to said first memory device.

5. The memory storage system of claim 1 wherein said controller utilizes standard hard disk drive formatting.

6. The memory storage system of claim 1 wherein said controller utilizes standard file allocation table hard disk drive formatting.

7. The memory storage system of claim 1 wherein said second memory device comprises static random access memory.

8. The memory storage system of claim 1 wherein said second memory device comprises expanded memory.

9. The memory storage system of claim 1 wherein said controller utilizes a standard basic input output system.

10. The memory storage system of claim 1 wherein said controller utilizes a terminate-and-stay-resident memory resident program.

11. The memory storage system of claim 1 wherein said controller comprises a cyclic address counter.

12. A method for implementing a flash memory device using standard hard disk drive memory formatting and for controlling the wear thereof, comprising:
   (a) writing the data to be saved in the flash memory device first to a memory cache until an entire block of memory has been saved therein; and
   (b) thereafter writing the entire saved memory block from the memory cache to the flash memory device.

13. The method of claim 12 further comprising the step of allocating write locations of said flash memory device so that successive write operations are distributed to all sections of flash memory device.

14. An electronic memory system comprising:
   (a) a first memory device for semipermanent memory storage;
   (b) a second memory device for rapid data transfer and temporary memory storage; and
   (c) a controller operatively connected with said first and second memory devices for monitoring and controlling writes to said first memory device so that data to be written to said first memory device is saved to said second memory device until an entire block has been saved and then writing said saved entire block to said first memory device.

15. The electronic memory storage system of claim 14 wherein said first memory device is flash memory.

16. The electronic memory storage system of claim 14 wherein said second memory device comprises control logic for writing and reading said data to and from said first memory device.

17. The memory storage system of claim 14 wherein said controller utilizes standard hard disk drive formatting.

18. The memory storage system of claim 14 wherein said controller utilizes standard file allocation table hard disk drive formatting.

19. The memory storage system of claim 14 wherein said second memory device comprises static random access memory.

20. The memory storage system of claim 14 wherein said second memory device comprises expanded memory.

21. The memory storage system of claim 14 wherein said controller utilizes a standard basic input output system.

22. The memory storage system of claim 1 wherein said controller utilizes a terminate-and-stay-resident memory resident program.

23. The memory storage system of claim 1 wherein said controller comprises a cyclic address counter.

24. A method for implementing a flash memory device and for controlling the wear thereof, comprising:

(a) writing the data to be saved in the flash memory device first to a memory cache until an entire block of memory has been saved therein;

(b) allocating write locations of said flash memory device so that successive write operations are distributed to all sections of flash memory device; and (c) thereafter writing the data from the memory cache to the flash memory device.

* * * * *